(No Model.)
T. SPENCER.
SELF REGULATING ELECTRIC CONVERTER.
No. 457,407. Patented Aug. 11, 1891.
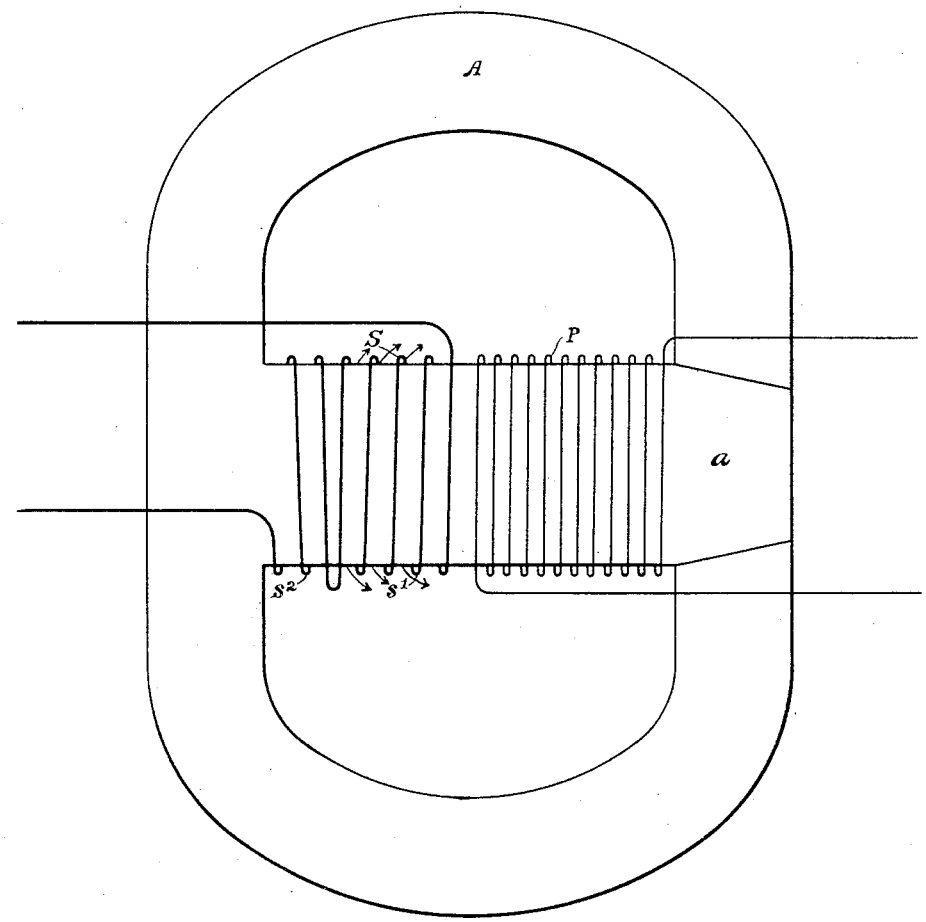
WITNESSES:
George Brown Jr.
James W. Smith
INVENTOR,
Thomas Spencer
Charles A. Terry Att'y.
THE NORRIS PETERS CO., PHOTO-LITHO., WASHINGTON, D. C.

UNITED STATES PATENT OFFICE.

THOMAS SPENCER, OF PITTSBURG, PENNSYLVANIA.

SELF-REGULATING ELECTRIC CONVERTER.

SPECIFICATION forming part of Letters Patent No. 457,407, dated August 11, 1891.

Application filed December 17, 1890. Serial No. 375,043. (No model.)

*To all whom it may concern:*

Be it known that I, THOMAS SPENCER, a citizen of the United States, residing in Pittsburg, in the county of Allegheny and State of Pennsylvania, have invented certain new and useful Improvements in Self-Regulating Electric Converters, of which the following is a specification.

The invention relates to certain improvements in electric converters and the method of causing them to automatically compensate for changes which result from variations in load.

In certain forms of converters the primary and secondary coils are placed side by side upon a soft-iron core. When currents traverse the primary coil, lines of force are generated which traverse or thread the secondary coils and develop therein an electro-motive force, which in turn establishes current in the secondary coil, if its circuit be closed. The lines of force developed by the flow of primary currents for the most part complete their circuit through the iron core; but in practice some of them escape through the air and thus do not thread all the convolutions of the secondary coil. In practice the number of lines thus escaping is greater as the current flowing in the secondary is greater, so that at full load the number of lines of force actually threading the secondary, and consequently the effective, electro-motive force developed therein is less than at small load. By my invention this effect is utilized for governing the operation of the converter and causing the electro-motive force to be maintained the same or even increased at full load.

The invention consists in placing upon the core a few convolutions of secondary wire wound in the reverse direction from the main portion thereof, and in locating these convolutions so that the escaping lines of force do not thread them. From this construction it results that when but little current is flowing in the secondary, and consequently but little opposition is offered to the flow of the lines of force through the core, practically all these lines of force thread both the main and the reversed secondary convolutions. The effect of the reversed convolutions is therefore to neutralize an equivalent number of the main convolutions. The consequent effective secondary electro-motive force developed is the resultant of the two opposing electro-motive forces in the two sets of convolutions. If now the resistance of the secondary circuit be diminished and more current be permitted to flow, then more of the lines of force will complete their circuit outside of the iron core, and thus fail to traverse the reversed secondary convolutions. The reversed convolutions will no longer neutralize the same number of main convolutions, and the resultant secondary electro-motive force will therefore be correspondingly increased.

In the accompanying drawing I have shown diagrammatically a converter illustrating one plan of carrying the invention into practice.

Referring to the figure, A represents a core of any convenient type. It is wound with coils P and S, placed side by side. The primary coil P is designed to be connected in any suitable constant-potential alternating-current circuit. The secondary coil S is composed of two sections $s'$ and $s^2$. The section $s'$ is the main section and intervenes between the primary coil P and the section $s^2$. This latter section comprises comparatively few convolutions, and is wound in the reverse direction from the section $s'$, so that the electro-motive force developed therein is opposed to that developed in the section $s'$. The current at any time flowing in the secondary coil of the converter is approximately one hundred and eighty degrees later than the current flowing in the primary. From this it follows that the magno-motive force developed by the flow of secondary currents is approximately one hundred and eighty degrees later than that produced by the primary current. The flow of the primary lines of force through the secondary coils is therefore due to the difference between these two opposing magno-motive forces, and as the current flowing in the secondary circuit increases, the increased opposition offered by reason of the increased secondary magno-motive force causes more of the primary lines of force to complete their circuit outside of the secondary coil, or without traversing the entire length of the secondary coil. Therefore when the resistance of the secondary circuit is high and but little work is being done, the opposition to the flow of lines of force through the iron core is small, and practically all those generated by the current flowing in the primary coil thread both sections of the secondary coil. When, however, the load is increased and the resistance of the secondary circuit is lowered, then the increased current flowing in the coil S results in greater opposition to the flow of lines of force therethrough, and consequently more will escape through the air-space without traversing the reversed secondary winding $s^2$, as indicated by the arrows $xx$ in the drawing. From this it follows that the resultant electro-motive force in the secondary coil will be increased, since the opposing electro-motive force in the section $s^2$ is relatively less.

The relative proportions of the two sections $s'$ and $s^2$ may be varied to obtain different degrees of compensation or amounts of regulation. Thus it may be desired to compensate merely for the drop in the converter due to the resistance of the conductor, or it may be desired also to compensate for the loss in the conductors comprising the work-circuit, so that the amount of reverse winding must be made to suit the requirements of different cases.

I claim as my invention—

1. An electric converter consisting of a core of soft iron, a primary coil carried thereby, a secondary coil wound upon a different portion of the core and having a portion of its convolutions remote from the primary coil wound in the reverse direction from the balance thereof.

2. In an electric converter, a secondary coil having a few of its convolutions wound in the opposite direction from the main portion.

3. The method of automatically governing the effective electro-motive force developed in the secondary coil of an electric converter, which consists in generating in that coil two opposing electro-motive forces and causing the value of the less of these electro-motive forces to diminish as the current flowing in the secondary circuit is increased.

In testimony whereof I have hereunto subscribed my name this 8th day of December, A. D. 1890.

THOMAS SPENCER.

Witnesses:
 CHARLES A. TERRY,
 J. W. SMITH.

Correction in Letters Patent No. 457,407.

It is hereby certified that in Letters Patent No. 457,407, granted August 11, 1891, upon the application of Thomas Spencer, of Pittsburg, Pennsylvania, for an improvement in "Self-Regulating Electric Converters," an error appears in the printed specification requiring the following correction, viz.: In line 43, page 2, the word "less" should read *lesser;* and that the said Letters Patent should be read with this correction therein that the same may conform to the record of the case in the Patent Office.

Signed, countersigned, and sealed this 13th day of October, A. D. 1891.

[SEAL.]

CYRUS BUSSEY,
*Assistant Secretary of the Interior.*

Countersigned:
W. E. SIMONDS,
*Commissioner of Patents.*